Aug. 12, 1924.

J. DE FABIO ET AL 1,504,745

TIRE PATCH AND PUMP

Filed Dec. 13, 1923

Inventors
Joseph De Fabio and
Robert M. Banks
By Worster & Davis
Attorneys

Patented Aug. 12, 1924.

1,504,745

UNITED STATES PATENT OFFICE.

JOSEPH DE FABIO AND ROBERT M. BANKS, OF BRIDGEPORT, CONNECTICUT.

TIRE PATCH AND PUMP.

Application filed December 13, 1923. Serial No. 680,476.

*To all whom it may concern:*

Be it known that we, JOSEPH DE FABIO, a subject of the King of Italy, and ROBERT M. BANKS, a citizen of the United States, both residing at Bridgeport, county of Fairfield, State of Connecticut, have invented a new and useful Tire Patch and Pump, of which the following is a specification.

This invention relates to a quick repair device for pneumatic tires, such as automobile tires, and has for an object to provide a simple and efficient device which may be easily and quickly attached to a tire should there be a blowout to close the same for a temporary repair, and will maintain the tire inflated until a garage or supply station may be reached, or until an opportunity for permanent repairs is secured.

With the foregoing and other objects in view, we have devised the construction illustrated in the accompanying drawing forming a part of this specification, similar reference characters being employed throughout the various figures to indicate corresponding elements. In this drawing, Fig. 1 is a side elevation of a portion of an automobile wheel and tire showing our improved device applied thereto, a portion of the device being broken away to more clearly show the construction.

Figure 1:
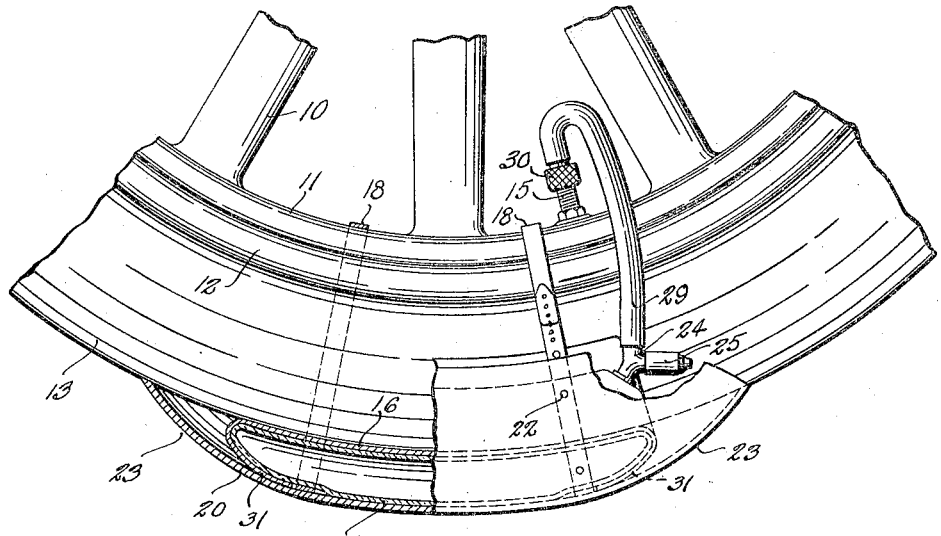
Figure 4:
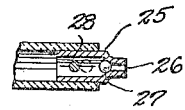
Fig. 4 is a detailed section through one form of a non-return valve.
Figure 2:
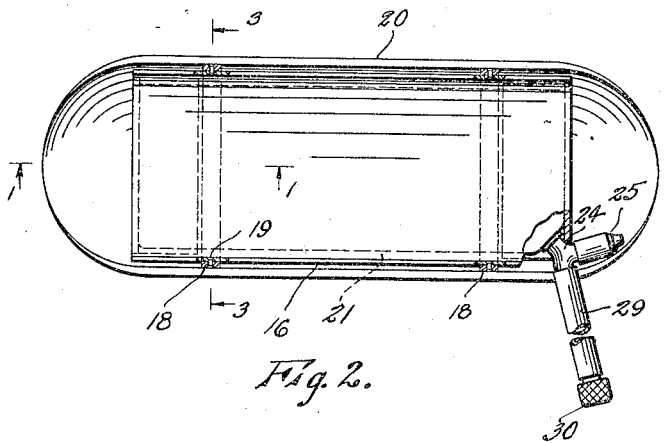
Fig. 2 is a top plan view of the device removed from the tire.

In Fig. 1 we have shown a portion of a conventional automobile wheel including the spokes 10, felly 11, and the usual rim 12 carrying the tire comprising the casing 13 and the inner tube 14. The inner tube is inflated by a pump or from any suitable source of air pressure through the usual nipple 15.

Our improved repair device is a combination patch for covering a break in a tire to make a temporary repair and prevent as far as possible in such a repair leakage of air from the tire through the break, and also to provide means which will be automatically operated as the wheel and tire rotate to pump sufficient air into the tire to compensate for the air which leaks past the repair device and will maintain the tire inflated until a garage or supply depot may be reached, or until permanent repairs my be effected. It is also constructed that it may be easily and quickly applied so that the car may proceed without the necessity of changing the tire on the road, the operation of applying this repair device being much easier and more quickly performed than could possibly be a change of tires.

Figure 3:
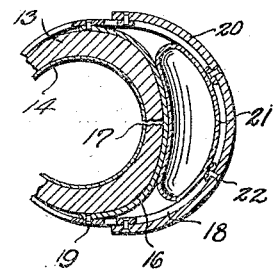
Fig. 3 is a transverse section through the device showing it applied to a tire.

The device comprises a flexible inner shoe 16, preferably of leather, which is so shaped as to tightly fit the contour of the casing when it is applied to a tire. We have indicated at 17 in Fig. 3 a break in the tire such as a blowout, and have shown the repair device applied to cover this break. As will be seen the inner shoe 16 fits tightly on the outer surface of the tire and it is clamped thereto by suitable straps 18 extending around the tire and the felly, these straps being secured to sides of the shoe 16 by suitable means, such as rivets 19. When this shoe is securely clamped over the break it will be quite effective in retaining the air in the tire but, of course, a device of this character cannot fully prevent leakage of air through the break. To compensate for this leakage we provide means which is automatically operated by rotation of the tire to pump sufficient air into the tire to make up for this leakage. To accomplish this we provide an outer shoe 20 also preferably of suitable flexible material, as leather, but it is made heavier than the inner shoe as it has to withstand wear and tear of contact with the road. It is also curved substantially as shown but is spaced outwardly from the inner shoe to provide a chamber for a flexible bag 21, preferably of rubber, and this bag tends to open up, that is, the walls tend to separate so as to inflate itself with air. As shown in Fig. 3, this bag presses against the outer surface of the shoe 16 so that it assists in holding the inner shoe against the break in the tire. The outer shoe is also secured to the straps 18 by rivets 22 so that this shoe is securely fastened in position. The opposite ends 23 of the shoe are curved inwardly, as shown in Fig. 1, to the surface of the tire and provide a gradual rise from the surface of the tire so that there will be no bump as the tire rotates. The inner shoe 16 is extended outwardly over the ends of the bag 21, as shown at 31, Fig. 1, to strengthen these ends and prevent their blowing out under the pressure incident to operation.

Connected to the bag 21 at any suitable location is a nipple 24 having a branch carrying a non-return valve 25 of any suitable character. We have shown a very simple valve which has an inlet opening 26 leading to the atmosphere and controlled by a ball 27. As the bag expands or opens up air is drawn in through this valve, the inward movement of the ball being limited by a suitable stop 28, but as pressure is applied to the bag as the device runs under the tire when it rotates, the valve will automatically close and the air in the bag will be forced by this pressure through the tube 29 and the nipple 15 into the tire. The tube carries the conventional attaching means 30. Thus on each revolution of the tire some air is pumped into it which will compensate for the air which leaks through the break and by the inner shoe. The pressure of the wheel on the device will flatten it out so that there is practically no bump as the wheel runs over the device.

It will be apparent that the device is very simple in construction and may be quickly and easily applied should a break occur, and it will effectively maintain the tire inflated until it is convenient to make a change or a permanent repair.

Having thus set forth the nature of our invention, what we claim is:

1. A combination patch and inflating device for pneumatic tires comprising spaced shoes of flexible material, a flexible bag between the shoes which will inflate itself with air when relieved of pressure, means for clamping the inner shoe over a break in a tire to close said break and a tube leading from the bag adapted for connection to the filling nipple of the tire.

2. A combination patch and inflating device for pneumatic tires comprising spaced shoes of flexible material, a flexible rubber bag between said shoes the walls of which tend to separate, a non-return valve connected with said bag and the atmosphere, a tube leading from the bag adapted for connection to the filling nipple of a tire, and means for clamping the device on the tire with the inner shoe covering a break in the tire.

3. A combination patch and inflating device for pneumatic tires comprising a flexible shoe adapted to substantially fit the outer contour of a tire, straps connected to said shoe and adapted to embrace the tire to clamp the shoe over a break or opening in the tire to close the same, a second shoe secured to said straps outside the first shoe, a flexible bag between said shoes tending to inflate itself with air, a non-return valve connecting said bag with the atmosphere, and a tube adapted to connect said bag with the filling nipple of the tire.

4. A combination patch and inflating device for pneumatic tires comprising means adapted to be clamped over a break or opening in a tire to close the same, and means operated as the tire rotates to pump air into the tire to compensate for the air which leaks through the break or opening.

5. A combination patch and inflating device for pneumatic tires comprising means adapted to be clamped over a break or opening in a tire to close the same, and means connected with the patch operated by pressure as the tire rotates to pump air into the tire to compensate for the air which leaks through the break or opening.

In testimony whereof we affix our signatures.

JOSEPH DE FABIO.
ROBERT M. BANKS.